United States Patent [19]

Bennett

[11] Patent Number: 4,788,872
[45] Date of Patent: Dec. 6, 1988

[54] REARMABLE SPRING CAGED AND ENERGIZED FREE GYRO

[75] Inventor: William E. Bennett, Westlake Village, Calif.

[73] Assignee: Kirkos Development Partners, Ltd., Newbury Park, Calif.

[21] Appl. No.: 917,965

[22] Filed: Oct. 14, 1986

[51] Int. Cl.⁴ ............................................. G01C 19/26
[52] U.S. Cl. ........................................ 74/514; 74/5.12
[58] Field of Search ............................... 74/5.14, 5.12

[56] References Cited

U.S. PATENT DOCUMENTS

| | | | |
|---|---|---|---|
| 818,987 | 4/1906 | Wheless | 74/5.12 X |
| 1,185,210 | 5/1916 | Leavitt | 74/5.12 |
| 1,296,331 | 3/1919 | Shonnard | 74/5.12 |
| 3,263,508 | 8/1966 | Voge et al. | 74/5.12 |
| 3,323,379 | 6/1967 | Brastow et al. | 74/5.14 |

*Primary Examiner*—Rodney H. Bonck
*Attorney, Agent, or Firm*—Blakely, Sokoloff, Taylor & Zafman

[57] ABSTRACT

A rearmable spring caged and energized free gyro which will allow repeated rearming for testing and use without requiring the opening of the main instrument enclosure, or requiring auxiliary sources of energy. The gyro is housed in an approximately cylindrical enclosure with the spin axis perpendicular to the axis thereof. A helical spring substantially coaxial with the enclosure is positioned adjacent one end of the enclosure, and may be wound through that end of the enclosure by an appropriate winding tool. During the winding of the spring a cam moves substantially coaxially along the inside of the enclosure, engaging a roller adjacent the end of the pitch axis which rotates the gimbal assembly around the roll axis to the roll axis caged position, at which time the end of the inner gimbal cooperatively references to the cam to align the spin axis. At the same time an annular gear moves axially in the enclosure to engage a gear on the end of the spin axis, so that upon complete winding of the spring the gyro is caged ready for firing. Upon release of the spring, typically by firing a squib, the annular gear engaging the gear on the end of the spin axis rotates a fraction of a turn to run the rotor up to speed, with additional rotation of the spring drive resulting in retraction of the axially moveable cam and annular gear to release the inner gimbal and spin axis for free gyro operation of the system.

11 Claims, 5 Drawing Sheets

REARMABLE SPRING CAGED AND ENERGIZED FREE GYRO

BACKGROUND OF THE INVENTION

1. Field of the Invention:

The present invention relates to the field of spring energized gyros.

2. Prior Art:

Spring energized gyros are two axis free gyros having a rotor which, when the unit is fired, is spun up by a prewound spring. In a simplest form, a drive member is coaxial with and extends to engage the end of the rotor shaft. Upon firing of the device by squib or otherwise, a prewound spring spins the drive member, with the drive member, rotor shaft and either the drive spring or another spring then cooperating to disengage and withdraw the drive member. Once withdrawn the rotor in an instrument in use will coast at a relatively high speed throughout the relatively short duration of its use, or if in test, will coast to a stop after a few minutes. In general during testing, the rotor will not stop in a position aligned with the drive member, so that in order to re-engage the drive member with the rotor shaft and rewind the spring, access to the instrument interior is required to allow manual repositioning the gimbals of the gyro for re-engagement of the drive member. Since the purpose of testing normally is to verify that the instrument as closed and sealed has the full required freedom and accuracy of operation, the opening of the instrument to rearm the same negates a substantial purpose of the test, as it provides an opportunity for the entry of foreign matter, may result in repositioning or breaking of lead wires, etc., which can only be discovered by again retesting. Accordingly, it is the purpose of the present invention to provide for the caging and rearming of a spring wound gyro after testing without having to gain entry into the main instrument enclosure, thereby eliminating the opportunity for entry of foreign matter, etc., and making testing thereof prior to actual use much more meaningful and a much more valid verification of what the performance in use will be.

BRIEF SUMMARY OF THE INVENTION

A rearmable spring caged and energized free gyro which will allow repeated rearming for testing and use without requiring the opening of the main instrument enclosure, or requiring auxiliary sources of energy is disclosed. The gyro is housed in an approximately cylindrical enclosure with the spin axis perpendicular to the axis thereof. A helical spring substantially coaxial with the enclosure is positioned adjacent one end of the enclosure, and may be wound through that end of the enclosure by an appropriate winding tool. During the winding of the spring a cam moves substantially coaxially along the inside of the enclosure, engaging a roller adjacent the end of the pitch axis which rotates the gimbal assembly around the roll axis to the roll axis caged position, at which time the end of the inner gimbal cooperatively references to the cam to align the spin axis. At the same time an annular gear moves axially in the enclosure to engage a gear on the end of the spin axis, so that upon complete winding of the spring the gyro is caged ready for firing. Upon release of the spring, typically by firing a squib, the annular gear engaging the gear on the end of the spin axis rotates a fraction of a turn to run the rotor up to speed, with additional rotation of the spring drive resulting in retraction of the axially moveable cam and annular gear to release the inner gimbal and spin axis for free gyro operation of the system. The combined caging and arming of the spring wound gyro by a single winding device avoids intrusion into the main enclosure of the instrument for rearming for repetitive testing and subsequent use.

BRIEF DESCRIPTION OF THE DRAWINGS

FIG. 2a is an end view of the instrument of FIG. 1 with the cover 24 removed.

FIG. 2b is a side view of the rachet member 28 and lever 36 as illustrated in FIG. 2a.

FIG. 3 is a partial cross section taken along line 3—3 of FIG. 2a.

DETAILED DESCRIPTION OF THE INVENTION

Figure 1:
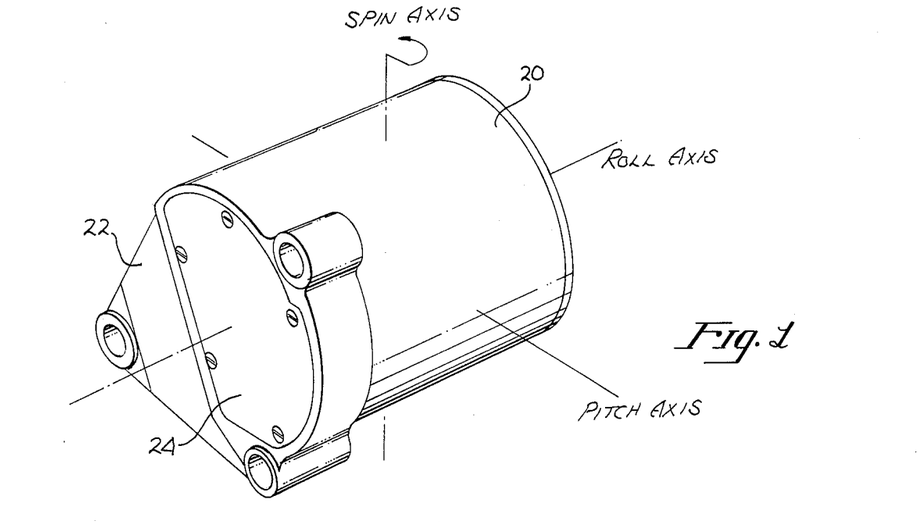
FIG. 1 is a perspective view of the preferred embodiment of the present invention.

First referring to FIG. 1, a perspective view of the preferred embodiment of the present invention may be seen. As shown, the instrument is comprised of a generally cylindrical enclosure 20, having three mounting holes on a flange 22 at one end of the housing and having a removable cover 24 on the flanged end of the instrument. For convenience of orientation with respect to the descriptions of the other figures to follow, the three major axes, specifically the roll axis, pitch axis and spin axis of the instrument, have been identified in this figure.

Figures 2A, 2B:
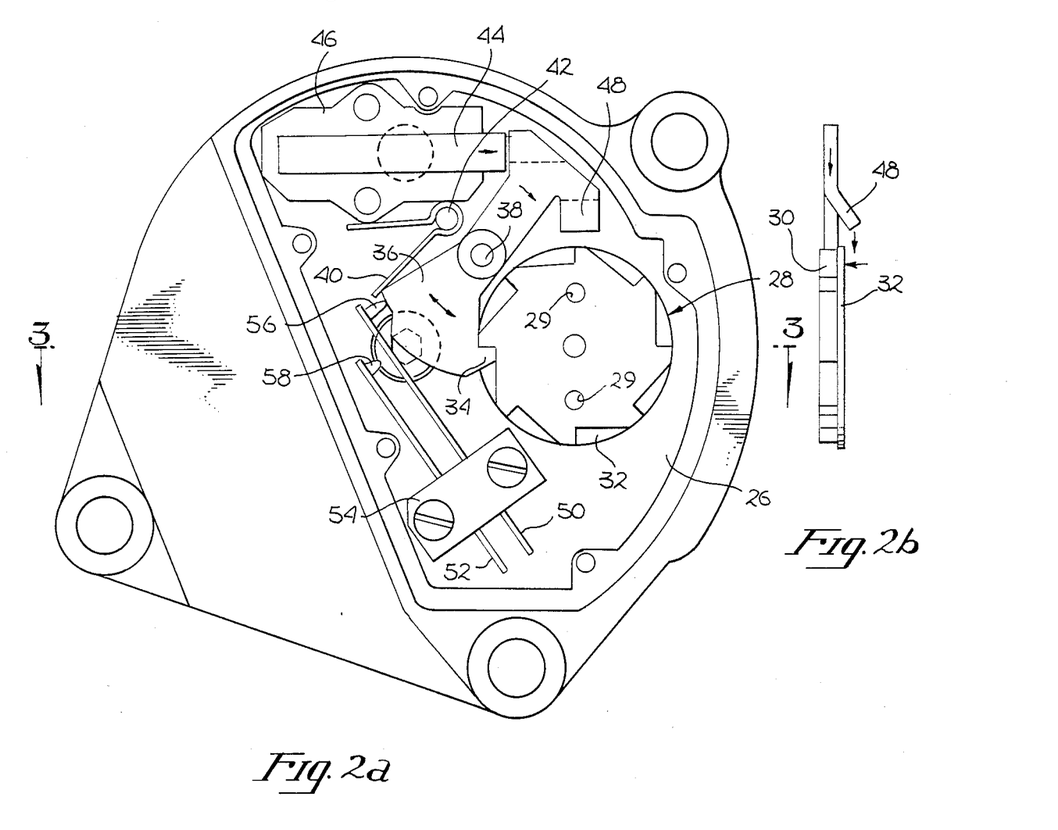

Now referring to FIG. 2a, an end view of the instrument of FIG. 1 with the cover 24 removed may be seen. It will be noted that the cover 24 merely covers a cavity at the flanged end of the instrument so that the removal thereof only exposes those few elements shown in the figure, with the main instrument assembly being separated therefrom by the interior wall 26.

As may be seen in the figure, located below cover 24 and accessible upon the removal thereof is a rachet member 28 having openings 29 therein for recaging the instrument and rewinding the re-energizing spring after firing the instrument for test purposes. The rachet member 28 as seen in a side view thereof in FIG. 2b is comprised of a toothed member 30 with a plate 32 on the back side thereof. The rachet member 28 is retained in the wound or partially wound positions by a pawl or dog 34 on arm 36 pivotally supported on pin 38 and yieldably encouraged to the dog 34 engaged position shown by spring 40 retained on pin 42. Mounted adjacent the opposite end of arm 36 is an electrically fireable squib 44 fastened to inner wall 26 through a mounting plate 46 and disposed so as to engage arm 36 to rotate the same about pin 38 to withdraw dog 34 from the rachet member 28 when fired. At the same time a finger 48 integral with arm 36 (see also FIG. 2b) is forced under plate 32 of the rachet member 28 to encourage the same upward for reasons which shall be subsequently described.

Also visible upon the removal of cover 24 is a pair of terminals 50 and 52 mounted on mounting block 54, the terminals 50 and 52 being leaf-like spring members extending through the block to positions adjacent the end of arm 36. In particular, end 56 of terminal 50 cooperates with a cam-like surface on the end of arm 36 to be deflectible upon rotation of the arm from the position shown to make electrical contact with the end 58 of terminal 52, thereby providing a switch closure signal indicative of the firing of the squib.

Figure 3:
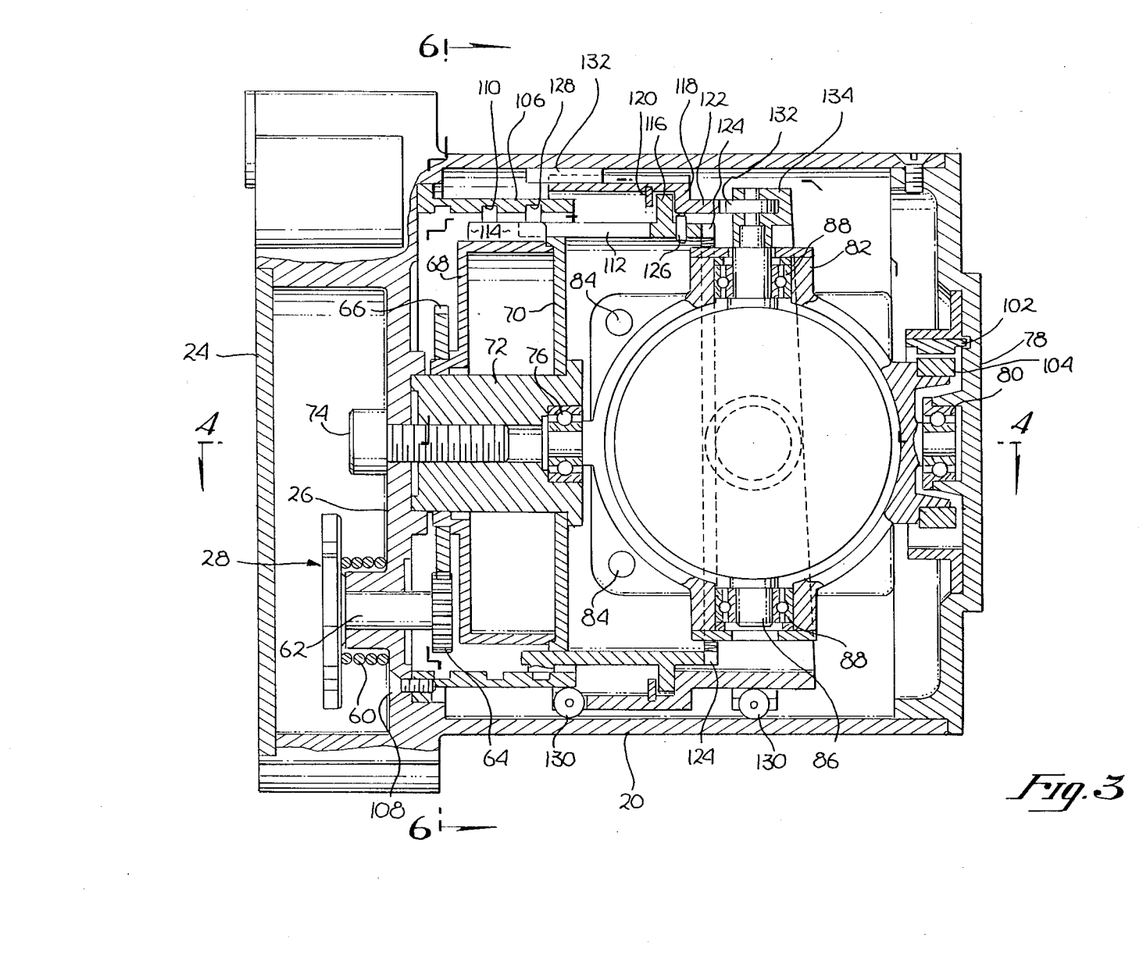

Now referring to FIG. 3, a partial cutaway view of the instrument of FIGS. 1 and 2 may be seen. In particular it will be noted that rachet member 28 is positioned somewhat above the inner wall 26, with a coil spring 60 yieldably encouraging the rachet member still further upward, the upward movement of the rachet member being inhibited when the instrument is armed by the engagement of dog 34 (FIG. 2a) with the plate 32 on the lower part of the rachet member. Other elements such as block 54, terminals 50 and 52, etc., are not shown in this region for purposes of clarity. As may be seen in this figure, the rachet member 28 is supported on pin 62 passing through a journal-like bearing formed as part of inner wall 26, the pin having a gear 64 on the inner end thereof. Cooperating with gear 64 is another gear 66 rigidly coupled to a spring housing 68 enclosed by a cover 70 fastened thereto. The assembly of gear 66, spring housing 68 and cover 70 is rotatably supported on a central pin 72 mounted to the inside surface of the inner wall 26 by a bolt 74 threaded thereinto, the inner diameters of the spring housing 68 and cover 70 having a freely rotatable fit on the pin 72. Locating within the enclosure defined by the spring cover 68 and cover plate 70 is a helical spring, not shown in FIG. 3, but visible in cross section as spring 176 in FIG. 7. The helical spring has its inner end anchored to pin 72, with the outer end thereof anchored to the spring housing 68. Accordingly, it may be seen that with the rachet member 28 and the gear 64 in the position shown in FIG. 3, the spring may be wound by turning the rachet member clockwise as viewed in FIG. 2a. It may also be seen that upon the firing of the squib 44, dog 34 (FIG. 2a) will be withdrawn from the rachet member 28, allowing the rachet member to start to spin as the helical spring starts to unwind with finger 48 on lever 36 in combination with coil spring 60 forcing the rachet member outward to withdraw gear 64 from engagement with gear 66, thereby allowing the spring to substantially immediately more freely unwind.

Mounted from pin 72 on a bearing 76 and from end wall 78 on bearing 80 is the outer or roll gimbal 82 having balance screws 84 therein for balancing the assembly about the roll gimbal axis. The inner or pitch gimbal 86 is mounted to the outer gimbal 82 on bearings 88. The pitch gimbal 86 is relatively flat to fit between rotor segments 90 of a dumbbell rotor configuration, the gimbal having a central hub 92 for supporting the spin bearings 94 therein. The two rotor segments 90 are supported on the bearings 94 by rotor shaft 96, one end of which has a pinion gear 98 thereon and the other end of which has a roller 100 thereon, the roller having a diameter substantially equal to the minor diameter of the pinion gear 98. Spin bearing end play is adjusted in the assembly by a pair of lock nuts 102.

The output of the instrument shown comprises a Hall effect sine-cosine generator of conventional construction on the outer or roll axis gimbal. The Hall effect generators 102 (only one being shown in FIG. 3) are mounted on the end 78 of the instrument enclosure with the permanent magnet 104 on the outer gimbal itself. Obviously if desired an appropriate pitch axis position pick off could also be used, and/or pickoffs of other construction could be used. Of course the single roll axis pick off of the type described coupled with the spring energized rotor avoids the need for any slip rings or other gimbal to gimbal and gimbal to case electrical contact. For purposes of clarity, electrical feedthroughs, pigtails, etc., for the pickoff outputs and the squib leads are not shown, though are of conventional construction for gyros and related instruments.

Referring again to FIG. 3, a cam ring 106 concentric to the spring housing 68 is rigidly mounted to the internal wall 26 by screws 108 (only one being shown in the figure). As shall subsequently be described in greater detail, the cam ring 106 has a slot 110 cut in its inner surface, the slot forming internal cam surfaces over approximately 720 degrees. Between the cam ring 106 and the spring housing 68 is a second ring, specifically a gear ring 112 effectively keyed to member 114 connected to the spring housing 68 so as to be slideable axially with respect thereto but not rotatable with respect thereto. The gear ring 112 has a flange 116 thereon captured between a shoulder 118 and a snap ring 120 on a caging ring 122 subsequently described. The gear ring 112 has gear teeth 124 cut in the end thereof which gear teeth cooperate with the pinion gear 98 when the gear ring 112 is in the position shown so that the instrument rotor will be spun by the rotation of the gear ring. This may be best seen in FIGS. 4 and 5. At the same time roller 100 will be supported by the tops of the gear teeth to help stabilize the inner rotor from deflecting about the pitch axis because of the component of force on the gear 98 parallel to the roll axis of the instrument.

The capturing of flange 116 on the gear ring 112 between the shoulder 118 and snap ring 120 on the caging ring 122 assures that the caging ring 122 and the gear ring 112 move in unison with respect to any axial movement thereof, though the gear ring 112 is free to rotate with respect to the cam ring because of the looseness of the fit of flange 116. To maintain the gear ring 112 coaxial with the caging ring 122, rollers 126 having their axes parallel to the roll axis of the instrument are positioned at 120 degree intervals in the space between the gear ring and the caging ring to ensure both accurate coaxial alignment and free rotation with respect thereto (only one of the rollers 126 being visible in FIG. 3). At the end of gear ring 112 opposite to the gear teeth 124 is a pin 128 projecting into slot 110 and thus acting as a cam follower for the cam effectively defined by the varying lead of the slot. Thus on rotation of the spring housing 68 the axial position of the gear ring 112 and the caging ring 122 will be determined by the cam arrangement defined by the slot 110 and pin 128.

Figure 6:
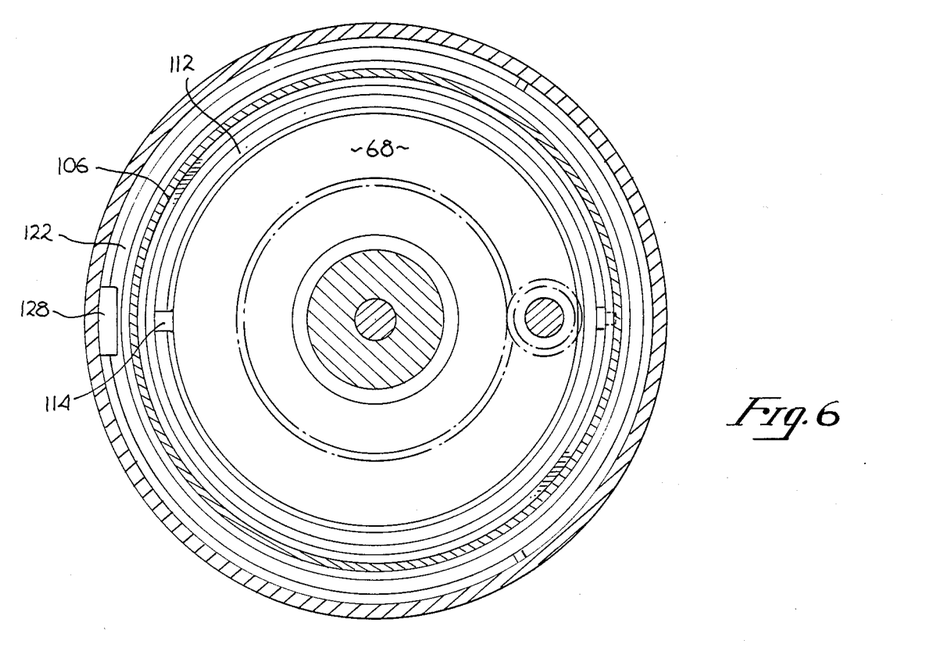
FIG. 6 is a partial cross section taken along line 6—6 of FIG. 3.

The caging ring 122 itself is guided along the interior wall of enclosure 20 for motion along the roll axis by rollers 130 adjacent opposite ends of the caging ring and positioned at 120 degree increments around the circumference of the caging ring. In that regard it should be noted that the shafts on which the various rollers hereinbefore described operate need not be fully journaled or captured in the various parts to which they are mounted, but rather may be merely captured in appropriately disposed U shaped slots as desired, as such slots will more than adequately retain appropriately shaped shafts or axles in the final assembly. The rollers 130 at the two spaced apart axial positions on the caging ring provide for the axial concentricity of the caging ring, yet free axial motion thereof as dictated by the rotation of the spring housing 68, the caging ring being restricted from rotation by the key arrangement 132 (FIG. 3). The relative positions of the gear ring 112, the cam ring 106 and the caging ring 122 as well as other parts such as the key 128, etc. being shown in FIG. 6 in a cross section taken along lines 6—6 of FIG. 3.

Figure 4:
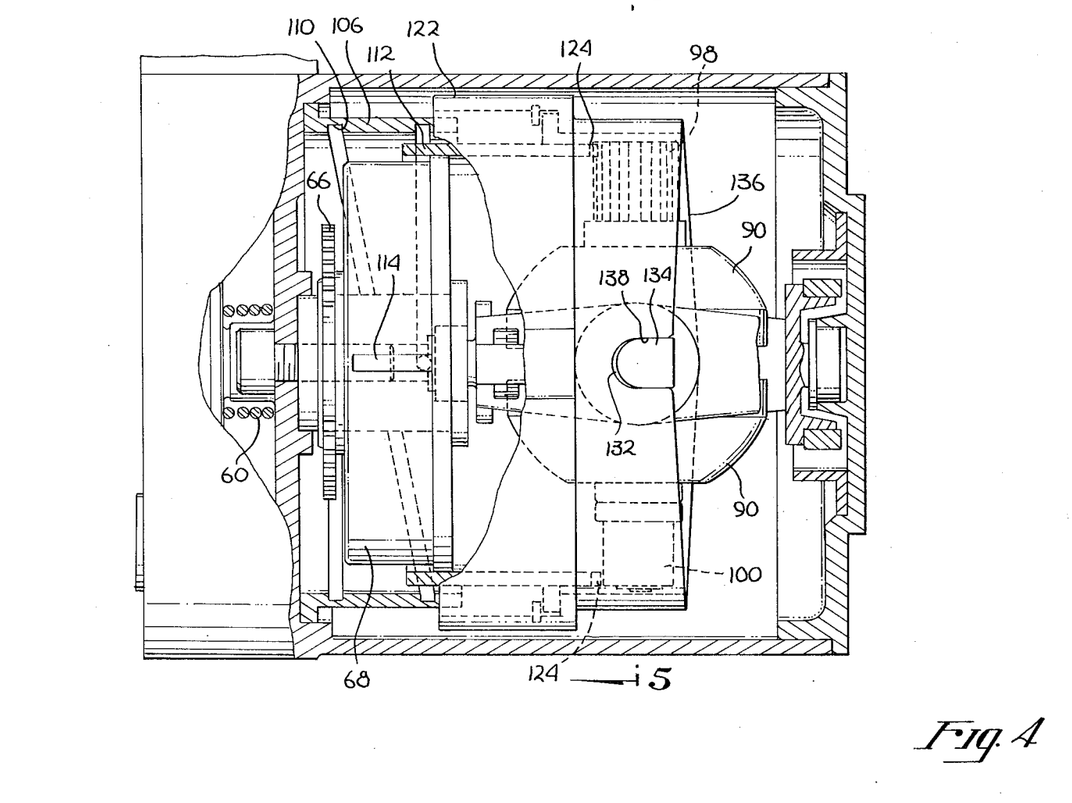
FIG. 4 is a partial cross section taken along line 4—4 of FIG. 3.
Figure 5:
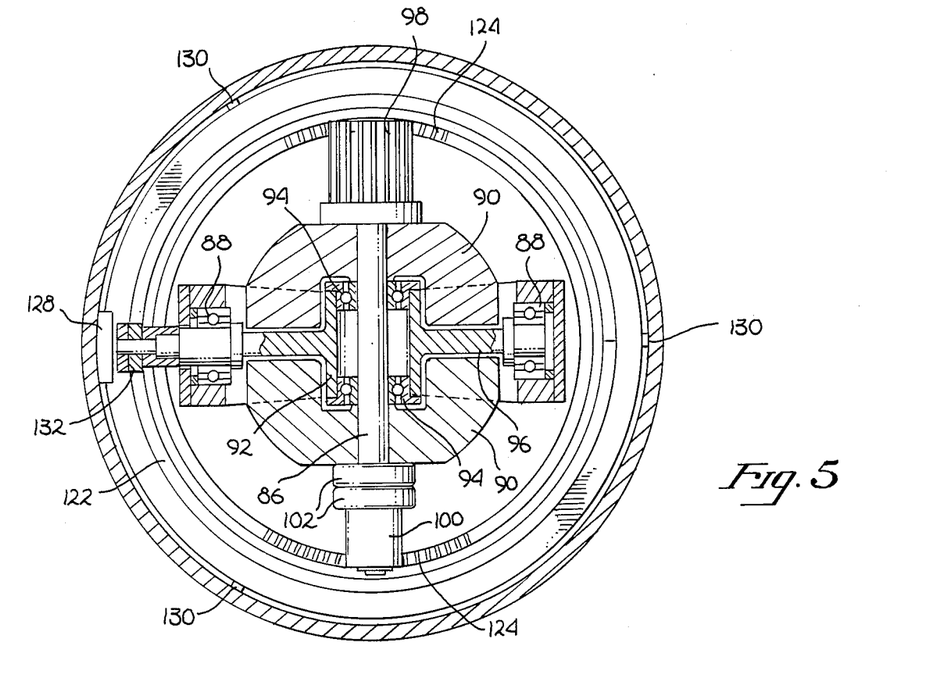
FIG. 5 is a partial cross section taken along line 5—5 of FIG. 4.

Now referring to FIGS. 4 and 5, details of the gimbal structure and cam ring which allow the cam ring to cage the instrument may be seen. In particular, a roller 132 is positioned adjacent one end of the inner or pitch gimbal axis at a location to cooperate with the end of the caging ring 122 as shown in FIG. 5. As shown in FIG. 4 and perhaps better illustrated in FIG. 7, the roller 132 is supported in a U shaped structure 134 having a width as viewed in FIG. 4 substantially equal to the diameter of the roller. As shown in FIG. 4, the end 136 of the caging ring 122 is tapered in both directions starting from a high point at one point thereof and terminating in a U shaped slot 138 at the desired caging point 180 degrees therefrom. Thus it may be seen that in the state illustrated in FIG. 4, the roll gimbal has been rotated until roller 132 fell into slot 138 and the inner gimbal has been aligned thereby, while simultaneously the ring gear 112 has engaged the pinion 98 on the spin axis, with the other end of the spin axis being supported on roller 100 from the tops of the ring gear teeth.

Figures 7, 8:
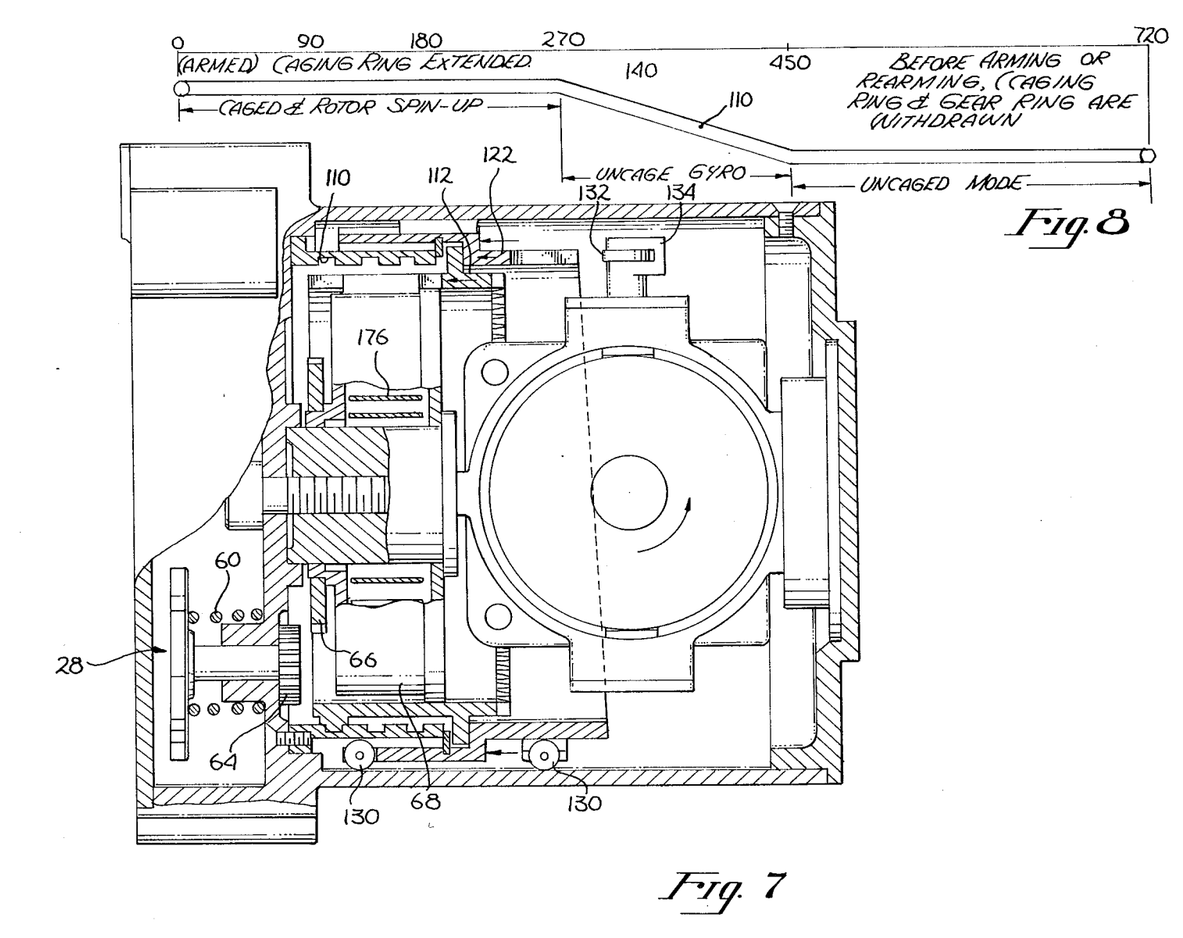
FIG. 7 is a partial cross section similar to FIG. 3 with the caging ring 122 in the uncaged position.
FIG. 8 is a graphic illustration of the cam slot 110 in the cam ring 106.

In FIG. 7 on the other hand, the caging ring 122 as well as the gear ring 112 are shown in the withdrawn or retracted positions. As retracted, unless otherwise restricted, the outer gimbal will have full 360 degree rotation capabilities and the inner gimbal will enjoy substantial angular freedom, though in the embodiment shown, not a full 360 degree freedom. In that regard, instruments of this general type generally require full freedom about the roll axis, but only limited freedom about the pitch axis, the preferred embodiment disclosed herein having approximately ±40 degrees of freedom about the pitch axis. Thus as the caging ring 122 moves from the position shown in FIG. 7 toward the position shown in FIGS. 3 and 4, roller 32 will engage the cam surface defined by the end of the caging ring 122 to first rotate the outer gimbal about the roll axis until the roller 132 falls into slot 138 (FIG. 4), at which time rotation about the roll axis, having reached the caged position, will stop. Member 134 will then be intercepted by the walls of the slot to rotate the inner gimbal to the caged position well before the roller bottoms in the slot, thereby rotating the inner gimbal to the caged position, and as importantly, to align the spin axis so that gear 98 and roller 100 are rotated about the pitch axis so as to be properly engaged by the gear teeth 124 on the end of the gear ring 112 as the caging ring 122 moves to its final caged position.

Having completed the description of the structure of the present invention and the manner in which caging is accomplished by the motion of the caging ring 122, the overall operation of the instrument will now be described. The slot 110 (see particularly FIGS. 3 and 7) has the general shape illustrated in FIG. 3. In particular, as stated before, the slot extends over approximately 720 degrees or two full turns, with a substantially circular portion of approximately 270 degrees at each end thereof interconnected by an approximately 180 degree section of substantial lead. The left end of FIG. 8 represents the armed condition as illustrated in FIGS. 3 and 4, wherein the caging ring is extended to maintain the gimbals in the caged position and of course the helical spring 76 is fully wound, whereas the right end of FIG. 8 represents the condition existing before arming or rearming of the instrument (or even very shortly after firing of the squib) wherein the caging ring is in the withdrawn or uncaged position so as to not restrict the gimbal freedom, as illustrated in FIG. 7.

For purpose of explanation it will be assumed that the currently installed squib has not been fired, and that the instrument is otherwise in the condition illustrated in FIG. 7. In this condition the pin 128 (see FIG. 3) will be at the right hand end of the slot 110 of FIG. 8. The first step in arming the instrument is to rotate lever 36 clockwise against spring 40 (FIG. 2a) to allow rachet member 28 (FIG. 7) to be pushed inward against coil spring 60 until gear 64 is in engagement with gear 66 on the spring housing 68 and the plate 32 (FIG. 2b) has moved to a position below or behind lever 36, at which time lever 36 may be allowed to spring back to the position illustrated in FIG. 2b. Then with the winding key, rachet member 28 is rotated in a direction to rotate the spring housing 68 to wind up spring 76, the rotation of the spring housing causing the pin 128 to move to the left in slot 110 of FIG. 8. As the spring continues to be wound, the caging ring and the gear ring will both be extended as the pin moves into the inclined portion of the cam slot, the caging ring caging the instrument as hereinbefore described as it is being extended and the gear ring ultimately engaging the gear on one end of the spin axis and the roller on the other end of the spin axis as the caging ring 112 moves to its final caged position. Thereafter as winding continues the instrument remains in the caged condition, with the winding of course ultimately terminating as the pin 128 ultimately reaches the left end of slot 110 as illustrated in FIG. 8. Note that because the gear ring 112 rotates with the spring housing which in turn rotates during winding, the teeth on the gear ring 122 will first engage the teeth in pinion gear 98 at approximately location 140 illustrated in FIG. 8, with the instrument rotor thereafter rotating about the spin axis as driven by the gears as winding continues. Of course on firing the instrument as hereinbefore described, rachet member 28 is both released for rotation and forced outward by spring 60 and the action of the squib to disengage gear 64 from gear 66 to allow the tightly wound spring to rotate the spring housing 68 and ring gear 112 to spin up the rotor, and to then withdraw both the caging ring and gear ring to allow the operation of the two axis free gyro during at least the initial period of the rotor coast down. Note that upon firing, rotor spin up occurs essentially during the first 270 degrees of rotation of the gear ring, after which time the gear ring and caging ring move to their uncaged positions. In general the 270 degree rotation is ample rotation to spin the rotor up, prototypes of the present invention spinning up to approximately 12,000 rpm during that period. Also note that from the foregoing description and the structure illustrated, the gyro in essence remains caged during the initial withdrawal of the caging ring because of the shape of the caging slot, etc., which essentially keeps the gyro caged until after the gear ring disengages from the pinion on the end of the spin axis. This tends to minimize any kick or mutation which may be incurred upon the disengagement of the gears due to the spring putting either an accelerating or decelerating torque on the spin axis gear at the moment of disengagement.

There has been described herein a new and unique rearmable spring caged and energized free gyro which allows the repeated testing thereof without having to gain access to the main instrument enclosure and without having to provide electrical or other alternative energy sources for effecting the caging thereof. While the present invention has been disclosed and described with respect to a preferred embodiment, it will be understood by those skilled in the art that various changes in form and detail may be made therein without departing from the spirit and scope of the invention.

I claim:

1. A spring energized two axis free gyro comprising a frame assembly;
   an outer gimbal supported on said frame assembly for rotation about a first outer gimbal axis;
   an inner gimbal supported on said outer gimbal for rotation about a second axis orthogonal to said first axis;
   a rotor supported on said inner gimbal for rotation about a spin axis orthogonal to said second axis;
   spring means supported on said frame assembly for storing energy when moved from a first state to a second state;
   winding means supported on said frame assembly for manually moving said spring means from said first state to said second state;
   spring retention means for maintaining said spring means in said second state until released by said release means;
   caging means coupled to said spring means and moveable in response to movement of said spring means between an uncaged position not interfering with rotation of said outer gimbal, and said inner gimbal through at least a limited angular freedom, and a caged position caging said inner and outer gimbals and retaining the same in a predetermined caged position;
   drive means supported for rotation about an axis concentric to said outer gimbal axis, said drive means being coupled to said spring means and moveable in response to movement of said spring means between a disengaged position when said spring means is in said first state wherein said drive means will not interfere with the rotation of said inner and outer gimbals and the free spinning of said rotor, and an engaged position when said spring means is in said second state engaging said rotor to spin said rotor responsive to movement of said spring means;
   whereby upon releasing of the spring retention means, the spring means will spin the motor as said spring means moves toward the first state, will move the drive means to the disengaged position and the caging means to the uncaged position for free gyro operation, with the gyro being recaged and the drive means reengaged upon reenergizing the spring means by moving it from the first state back to the second state.

2. The spring energized two axis free gyro of claim 1 wherein said rotor includes a gear on said spin axis and wherein said drive means includes a gear moveable parallel to said outer gimbal axis to engage and disengage said gear on said spin axis.

3. The spring energized two axis free gyro of claim 2 wherein said caging means comprises a cam moveable in the direction of said first axis to engage and disengage a cam follower on said inner gimbal to cage and uncage the gyro.

4. The spring energized two axis free gyro of claim 3 wherein said cam and said drive means gear are coupled together to move in translation in unison.

5. The spring energized two axis free gyro of claim 4 wherein said cam and said drive means remain in said caged and said engaged positions, respectively, as said spring means moves away from said second state toward said first state, followed by movement from said caged and said engaged positions, respectively, to said uncaged and said disengaged positions respectively as said spring means moves closer to said first state.

6. The spring energized two axis free gyro of claim 5 wherein said drive means disengages from said gear on said rotor before said cam means uncages the gyro as said spring means moves from said second state to said first state.

7. A spring energized two axis free gyro comprising a frame assembly;
   an outer gimbal supported on said frame assembly for rotation about a first axis;
   an inner gimbal supported on said outer gimbal for rotation about a second axis orthogonal to said first axis;
   a rotor supported on said inner gimbal for rotation about a spin axis orthogonal to said second axis, said rotor having a gear at one end thereof and connected thereto behind spring means supported on said frame assembly approximately concentric to said first axis for storing energy when moved from a first state to a second state;
   winding means supported on said frame assembly for manually moving said spring means from said first state to said second state;
   spring retention means for maintaining said spring means in said second state until released by said release means;
   caging means coupled to said spring means and moveable in response to movement of said spring means between an uncaged position not interfering with rotation of said outer gimbal, and said inner gimbal through at least a limited angular freedom, and a caged position caging said inner and outer gimbals and retaining the same in a predetermined caged position;
   drive means supported for rotation about an axis concentric to said outer gimbal axis, said drive means being coupled to said spring means and substantially concentric therewith, such drive means having gear teeth on one end thereof and being moveable in response to movement of said spring means between a disengaged position when said spring means is in said first state wherein said drive means will not interfere with the rotation of said inner and outer gimbals and the free spinning of said rotor, and an engaged position when said spring means is in said second state with said gear teeth thereon engaging the gear on said rotor to spin said rotor upon rotation of said drive means responsive to movement of said spring means;
   whereby upon releasing of the spring retention means, the spring means will spin the rotor as it moves toward the first state, will move the drive means to the disengaged position and the caging means to the uncaged position for free gyro operation, with the gyro being recaged and the drive means reengaged upon reenergizing the spring means by moving it from the first state back to the second state.

8. The spring energized two axis free gyro of claim 7 wherein said caging means comprises a cam moveable parallel to said first axis to engage and disengage a cam follower on said inner gimbal to cage and uncage the gyro.

9. The spring energized two axis free gyro of claim 8 wherein said cam and said drive means gear are coupled together to move in linear translation in unison.

10. The spring energized two axis free gyro of claim 9 wherein said cam and said drive means remain in said caged and said engaged positions, respectively, as said spring means moves away from said second state toward said first state, followed by movement from said caged and said engaged positions, respectively, to said uncaged and said disengaged positions respectively as said spring means moves closer to said first state.

11. The spring energized two axis free gyro of claim 9 wherein the linear motion of said cam means and said drive means is defined by a second means cam and a cam follower operative between said frame assembly and the movement of said spring means.

* * * * *